United States Patent [19]

Adolph

[11] Patent Number: 5,838,265
[45] Date of Patent: *Nov. 17, 1998

[54] METHOD, ENCODER AND DECODER FOR RESYNCHRONIZATION TO A DATA STREAM WHICH CONTAINS ERRORS

[75] Inventor: Dirk Adolph, Ronnenberg, Germany

[73] Assignee: Deutsche Thomson Brandt GmbH, Villingen Schwenningen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 652,237

[22] Filed: May 23, 1996

[30] Foreign Application Priority Data

Jul. 7, 1995 [DE] Germany .................. 195 24 808.2

[51] Int. Cl.$^6$ .................. H04J 3/06; H04L 1/00
[52] U.S. Cl. .............................. 341/50; 348/408
[58] Field of Search .................. 341/65, 67, 106, 341/50, 94; 348/402, 408, 390, 500

[56] References Cited

U.S. PATENT DOCUMENTS

| | | | |
|---|---|---|---|
| 4,280,224 | 7/1981 | Chethik | 375/116 |
| 5,377,266 | 12/1994 | Katta et al. | 380/20 |
| 5,502,494 | 3/1996 | Auld | 348/426 |
| 5,719,646 | 2/1998 | Kikuchi et al. | 348/845.1 |

FOREIGN PATENT DOCUMENTS

| | | | |
|---|---|---|---|
| 0565219 | 10/1993 | European Pat. Off. | H04N 7/13 |
| 0591944 | 9/1994 | European Pat. Off. | H04N 7/13 |
| 3502317 | 7/1986 | Germany | H04N 5/21 |
| 4408522 | 9/1994 | Germany | G06F 15/65 |
| 4316225 | 11/1994 | Germany | H04J 3/06 |

OTHER PUBLICATIONS

D'Alessandro, Pierluigi & Lancini, Rosa "Video Coding Scheme Using DCT–Pyramid Vector Quantization" In: IEEE Transactions on IMage Prcoessing, vol. 4, No. 3, Mar. 1995, S. 309–319.

(Teil 5–1) Fernseh under Kino–Technik, 48.Jg., Nr.9/1994, S.460–466, S–468.

*Primary Examiner*—Brian K. Young
*Assistant Examiner*—Peguy JeanPierre
*Attorney, Agent, or Firm*—Joseph S. Tropoli; Frederick A. Wein

[57] ABSTRACT

When digital data are being transmitted, parts of these data can be irreversibly destroyed by channel interference. Gaps produced in this way in the bit stream must be indicated and the respective decoder must be resynchronized. When encoding in accordance with the MPEG2 standard is used, the timing of this resynchronization is heavily dependent on the contents of the bit stream elements which have been lost. Thus, in the event of failure of the picture start codes or extension start codes of the frame layer which are important for the decoding, although the decoder will resynchronize to the slice-start code of the following slice layer, important information such as the time reference of the frame, for example, the frame type (I-, P-, B-frame) or else important parameters relating to the decoding of movement vectors may be false in this case, however. The result of this is that the decoder cannot decode at least one frame, it being possible for consequential errors to occur in addition, if frames which are to be predicted later are based on the missing frame. According to the invention, additional information is thus inserted into the slice header, which information contains the most important information about the respective frame and thus enables decoding even in the event of loss of the picture start code or extension start code.

13 Claims, 4 Drawing Sheets slice syntax

| slice ( ) { | bits | Mnemonic |
|---|---|---|
| slice_start_code | 32 | bslbf |
| if (vertical_size > 2800) | | |
| slice_vertical_position_extension | 3 | uimsbf |
| if (< sequence_scalable_extension ( ) is present in the bitstream >) | | |
| if (scalable_mode == "data partitioning" ) | | |
| priority_breakpoint | 7 | uimsbf |
| quantiser_scale_code | 5 | uimsbf |
| if ( nextbits ( ) == '1' ) { | | |
| intra_slice_flag | 1 | bslbf |
| intra_slice | 1 | uimsbf |
| reserved_bits | 7 | uimsbf |
| while ( nextbits ( ) == '1' ) { | | |
| extra_bit_slice /* with the value "1" */ | 1 | uimsbf |
| extra_information_slice | 8 | |
| } | | |
| } | | |
| extra_bit_slice /* with the value "0" */ | 1 | uimsbf |
| do { | | |
| macroblock ( ) | | |
| } while ( nextbits ( ) != '000 0000 0000 0000 0000 0000' ) | | |
| next_start_code ( ) | | |
| } | | |

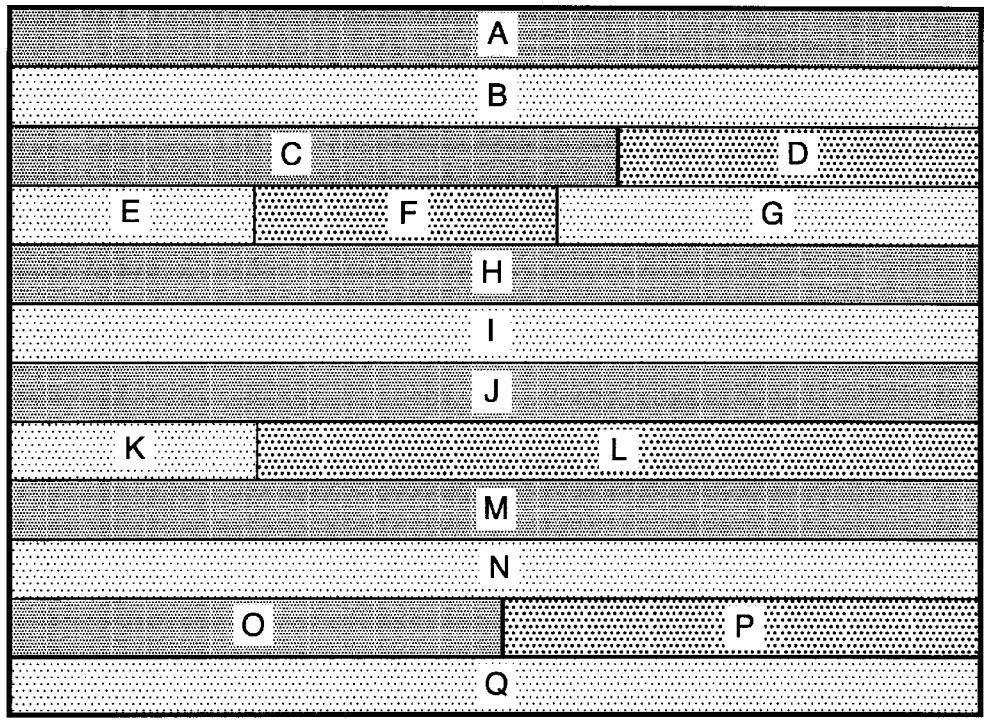

SLICE STRUCTURE OF A FRAME

FIG. 1

| EXTRA INFORMATION SLICE | |
|---|---|
| PICTURE HEADER: | BITS |
| TEMPORAL_REFERENCE | 8 |
| PICTURE_CODING_TYPE | 2 |
| PICTURE CODING EXTENSION: | |
| FORWARD_HORIZONTAL_f_CODE | 4 |
| FORWARD_VERTICAL_f_CODE | 4 |
| BACKWARD_HORIZONTAL_f_CODE | 4 |
| BACKWARD_VERTICAL_f_CODE | 4 |
| INTRA_DC_PREDICTION | 2 |
| CONCEALMENT_MOTION_VECTORS | 1 |
| q_SCALE_TYPE | 1 |
| INTRA_VLC_FORMAT | 1 |
| ALTERNATE_SCAN | 1 |

INFORMATION CONTENTS OF THE SLICE HEADER

FIG. 3 slice syntax

| slice ( ) { | bits | Mnemonic |
|---|---|---|
| slice_start_code | 32 | bslbf |
| if (vertical_size > 2800) | | |
| slice_vertical_position_extension | 3 | uimsbf |
| if (< sequence_scalable_extension ( ) is present in the bitstream > ) | | |
| if (scalable_mode == "data partitioning" ) | | |
| priority_breakpoint | 7 | uimsbf |
| quantiser_scale_code | 5 | uimsbf |
| if ( nextbits ( ) == '1' ) { | | |
| intra_slice_flag | 1 | bslbf |
| intra_slice | 1 | uimsbf |
| reserved_bits | 7 | uimsbf |
| while ( nextbits ( ) == '1' ) { | | |
| extra_bit_slice  /* with the value "1" */ | 1 | uimsbf |
| extra_information_slice | 8 | |
| } | | |
| } | | |
| extra_bit_slice  /* with the value "0" */ | 1 | uimsbf |
| do { | | |
| macroblock ( ) | | |
| } while ( nextbits ( ) != '000 0000 0000 0000 0000 0000' ) | | |
| next_start_code ( ) | | |
| } | | |

*FIG. 2*

METHOD, ENCODER AND DECODER FOR RESYNCHRONIZATION TO A DATA STREAM WHICH CONTAINS ERRORS

The invention relates to a method, an encoder and a decoder for resynchronization to a data stream which contains errors and may be composed of, in particular, digital video signals.

BACKGROUND OF THE INVENTION

When digital data are being transmitted, parts of these data can be irreversibly destroyed by channel interference. Gaps produced in this way in the bit stream must be indicated and the respective decoder must be resynchronized. When encoding in accordance with the MPEG2 standard is used, the timing of the resynchronization is heavily dependent on the contents of the bit stream elements which have been lost, it being possible for undesirably long failure times to arise in the decoder which is used, as a result of consequential errors occurring.

One possibility for avoiding such undesirably long resynchronization times is adaptation of the channel encoding. To this end, the MPEG-2 bit stream must be analyzed, and particularly important elements of the bit stream must be provided with greater transportation protection. However, as a result of the complex bit stream analysis and the additional error protection, this method is not always possible or economic.

BRIEF SUMMARY OF THE INVENTION

The invention is based on the object of specifying a method for modification of a data stream, in order to achieve a shorter resynchronization time and a reduction in consequential errors.

The invention is based on the further object of specifying an encoder and a decoder for use of the method according to the invention.

In the MPEG2 standard, the syntax and semantics of a bit stream which is to be transmitted are defined, for the generic source encoding, by frames in which movement occurs and associated audio/text information. Hierarchies in the form of a total of six layers are inserted in order to separate the basic elements in the video source encoding from one another and thus to make available, for example, suitable access mechanisms. A specific number of slices are in this case transmitted for each frame layer, that is to say each frame. These so-called slice layers offer the lowest level for resynchronization of the decoder.

If data are lost during transmission via a channel which is subject to interference, then the picture start codes or extension start codes of the frame layer, which are important for decoding, can also be affected by this. Although the decoder will resynchronize to the slice start code of the following slice layer in such a case, it will no longer be able to decode the data, however, because important information such as the time reference of the frame, for example, the frame type (I-, P-, B-frame) or else important parameters for the decoding of movement vectors are false.

This results in the decoder not being able to decode at least one frame. In addition, consequential errors can also occur during the decoding if frames which are to be predicted later are based on the missing frame. In the extreme case, this can lead to the loss of the picture header of an I-frame causing video interference in all the following frames until the next I-frame. If the size of the group of pictures is N=12 and the frame repetition rate is 50 Hz, this means interference over a time period of 0.48 seconds.

In consequence, additional information is inserted, according to the invention, at an advantageous point into the slice header, which information contains the most important information about the respective frame and thus allows decoding even in the event of loss of the picture start code or extension start code, the number of bits of this additional information being kept as low as possible in order to minimize the amount of data which has to be additionally transmitted.

In principle, the method according to the invention for enabling decoder-end resynchronization to a data stream which contains errors and is encoded, for the purpose of data compression, in the form of a hierarchical organization of various layers, consists in that additional information from at least one superordinate layer or about the composition of at least one superordinate layer is inserted into at least one subordinate layer, the additional information being usable for the resynchronization.

In principle, the method according to the invention for resynchronization to a data stream which contains errors and has been encoded at the encoder end, for the purpose of data compression, in the form of a hierarchical organization of various layers, consists in that the additional information which is contained in at least one subordinate layer is determined from at least one superordinate layer or about the composition of at least one superordinate layer and is used for the resynchronization.

This method can be used, for example, when the data stream complies with the MPEG standard, in particular the MPEG2 standard.

The slice layer then advantageously contains additional information about the frame layer, the additional information being located in the header of the slice layer.

The additional information is in this case preferably used only in the I- and P-frames, the additional information advantageously being transmitted only in every other or in every third macroblock line.

The additional information particularly advantageously relates to the time reference of the frame and/or the frame type (I-, P-, B-frame) and/or to important parameters for decoding of movement vectors.

The additional information is preferably selected in such a manner that the number of bits required for this purpose is less than the number of bits for the corresponding information in the superordinate layers, in order to keep as small as possible the amount of data which has to be transmitted in addition.

In principle, the encoder according to the invention for a method for enabling decoder-end resynchronization to a data stream which contains errors and is encoded, for the purpose of data compression, in the form of a hierarchical organization of various layers, and which is provided with means for compression of the data, consists in that means are provided in which additional information about the composition of those layers which are superordinate to the subordinate layers is generated or determined for the latter, the additional information being usable for the decoder-end resynchronization, and the compressed data and the additional information being joined together to form a data stream.

In the case of the means for compression of the video data in the encoder, means for Huffman encoding are furthermore advantageously arranged after means for calculation of the correlation between successive frames and the correlation within a frame, the Huffman-encoded data being supplied to a buffer memory and the means in which additional information about the composition of those layers which are superordinate to the subordinate layers is generated for the latter are arranged between an encoder unit for generation of header parameters and the buffer memory.

In principle, the decoder according to the invention for a method for resynchronization to a data stream which contains errors and has been encoded at the encoder end, for the purpose of data compression, in the form of a hierarchical organization of various layers, and which is provided with means for decompression of the data stream, consists in that means are provided in which additional information about the composition of those layers which are superordinate to the subordinate layers is regenerated for the latter, the additional information being used for the resynchronization.

In the case of the decoder, the means for decompression of the video data advantageously comprise means for calculating the correlation between successive frames and the correlation within a frame and means for Huffman decoding and, before the means for Huffman decoding, the data stream is also supplied to an encoder unit, in which header parameters are determined, and to the means in which additional information about the composition of those layers which are superordinate to the subordinate layers is regenerated for the latter.

BRIEF DESCRIPTION OF THE DRAWINGS

Exemplary embodiments of the invention are described with reference to the drawings, in which:

FIG. 1 shows a possible slice structure of a frame,

FIG. 2 shows the slice syntax with the syntax element extrainformationslice,

FIG. 3 shows the additional information contents of the slice header,

DESCRIPTION OF THE PREFERRED EMBODIMENTS

By way of example, FIG. 1 shows the slice structure of a frame, the various slices being designated by different letters A . . . Q. In this case, the frame is covered by slices without any gaps (restricted slice structure) Each slice is built up in accordance with the video bit stream slice syntax in the MPEG2 specification ("Generic Coding of Moving Pictures and Associated Audio"; ITU-T Recommendation H.262; ISO/IEC 13818-2; International Standard; 9 Nov. 1994)

The slice structure is illustrated in FIG. 2. Each slice is composed of a slice header, which comprises a plurality of syntax elements, and the respective frame contents which are arranged in macroblocks. The slice header is introduced by the element slicestartcode which is 32 bits long and starts with a sequence of 23 zeros to which the decoder can synchronize itself. The syntax element extrainformation slice which is likewise located in the slice header can now likewise be used to receive important information from the picture header or picture extensions. If a picture header or picture extensions are lost during the transmission, then the decoder is nevertheless able to decode the remainder of the frame correctly, since the information required for this purpose is contained in the slice header.

FIG. 3 shows an example of the information which additionally has to be accommodated in the slice header. In this case, the syntax element temporalreference, in which an integer number indicates the chronological arrangement of an encoded frame, and the syntax element picture coding type, which indicates whether the frame is I-, P- or B-encoded, are required from the picture header. In order to keep the amount of data which additionally has to be transmitted as low as possible, the number of transmitted bits can in this case advantageously be reduced. Thus 8 bits are also adequate, instead of 10 bits, for the temporal reference parameter in the slice header. The number of bits for the picturecodingtype parameter can be reduced from 3 to 2 , since one bit is at the moment reserved for future applications and is not required in the slice header. In addition, only the most important parameters from the picture-coding extension need be included in the slice header. 46 additional bits therefore have to be transmitted in the slice header, so that the extended slice header is 32+46 bits long.

If the extended slice header is transmitted in each slice, then the resultant overhead can make the picture quality of the decoded video poorer. An extended slice header is thus advantageously transmitted only in I- and P-frames. A further reduction in the overhead can be achieved by the extended slice header being transmitted only in every other or in every third macroblock line.

Figure 4:
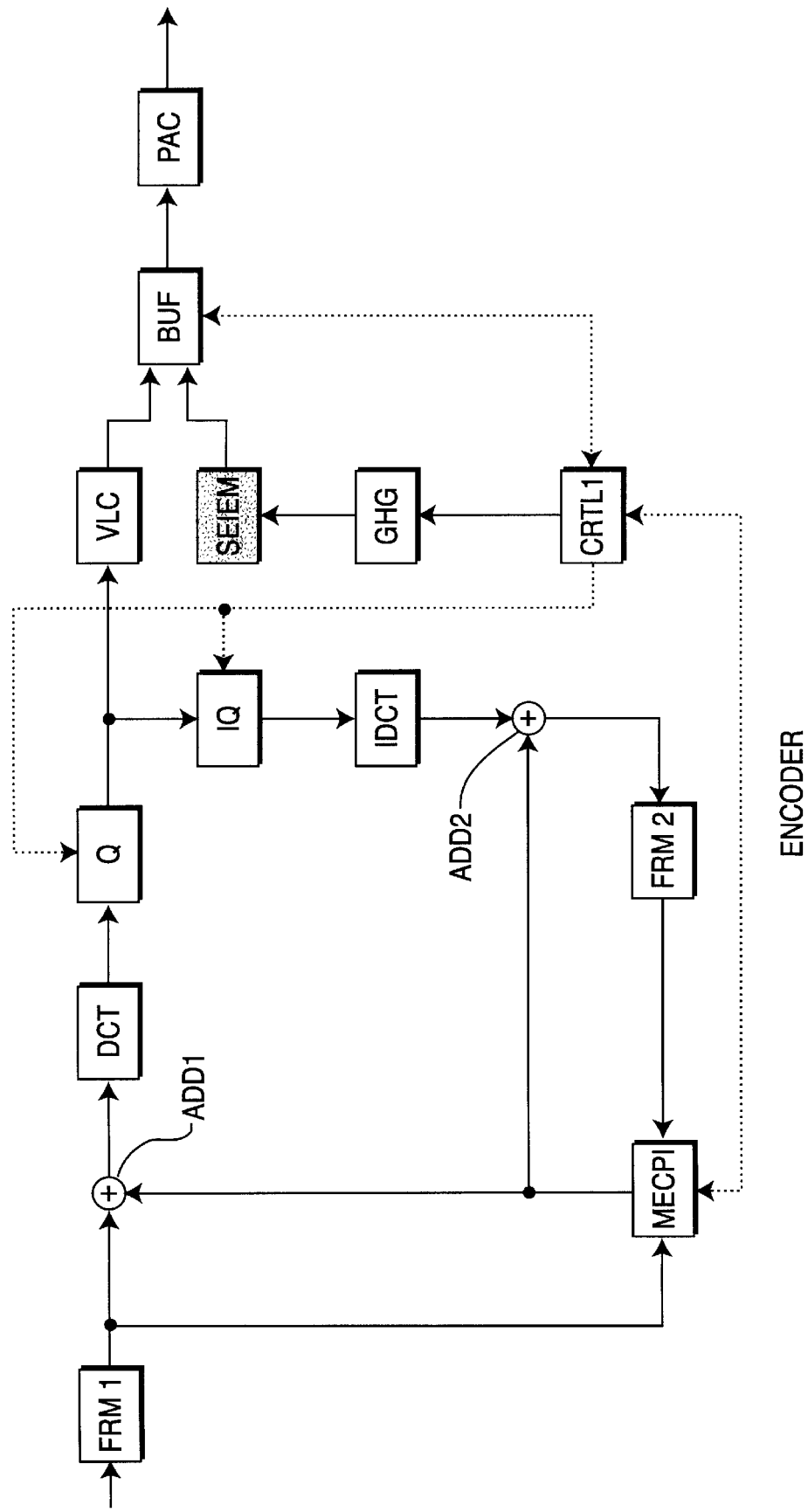
FIG. 4 shows a block diagram of an encoder which also includes the encoding of the modified slice header.

FIG. 4 illustrates the block diagram of an encoder which inserts the additional information into the slice header. The video data are initially read to a first frame memory FRM1. The data are then subjected to discrete cosine transformation in the encoder unit DCT in order to use the correlations within a frame for data compression. The result of the DCT is then quantized in the quantizer Q.

In addition, the correlations between successive frames can furthermore be used in differential pulse-code modulation (DPCM), the quantized DPCM frame being calculated in a feedback loop. To this end, an inverse quantization is first carried out in the unit IQ, followed by an inverse discrete cosine transformation in IDCT. The use of methods for movement estimation and movement compensation in MECPI with the aid of the frame memory FRM2 then enables the following frame to be predicted. The result of this prediction is then applied to the subtractive input of the adder ADD1, in order to determine the difference picture between the actual frame and the result of the prediction.

The output values from the quantization are encoded in VLC with a variable length in accordance with Huffman. These data are joined together with the necessary header parameters from the header encoder unit GHG as well as the extrainformationslices, which are designed according to the invention and are generated in the unit SEIEM, to form a bit stream. Since the data rate which is produced varies as a function of the respective frame contents, compensation for fluctuations is carried out in a buffer memory BUF, in order to achieve matching to the constant rate of the transmission channel. If there is a threat that the capacity of the buffer memory is inadequate, then coarser quantization is selected, in order to reduce the data rate. The required quantization rate for the quantizer Q is calculated for this purpose in the unit CTRL1, the current rate also being reported to the units MECPI and GHG. Finally, the data in PAC are included in a multiplex frame.

Figure 5:
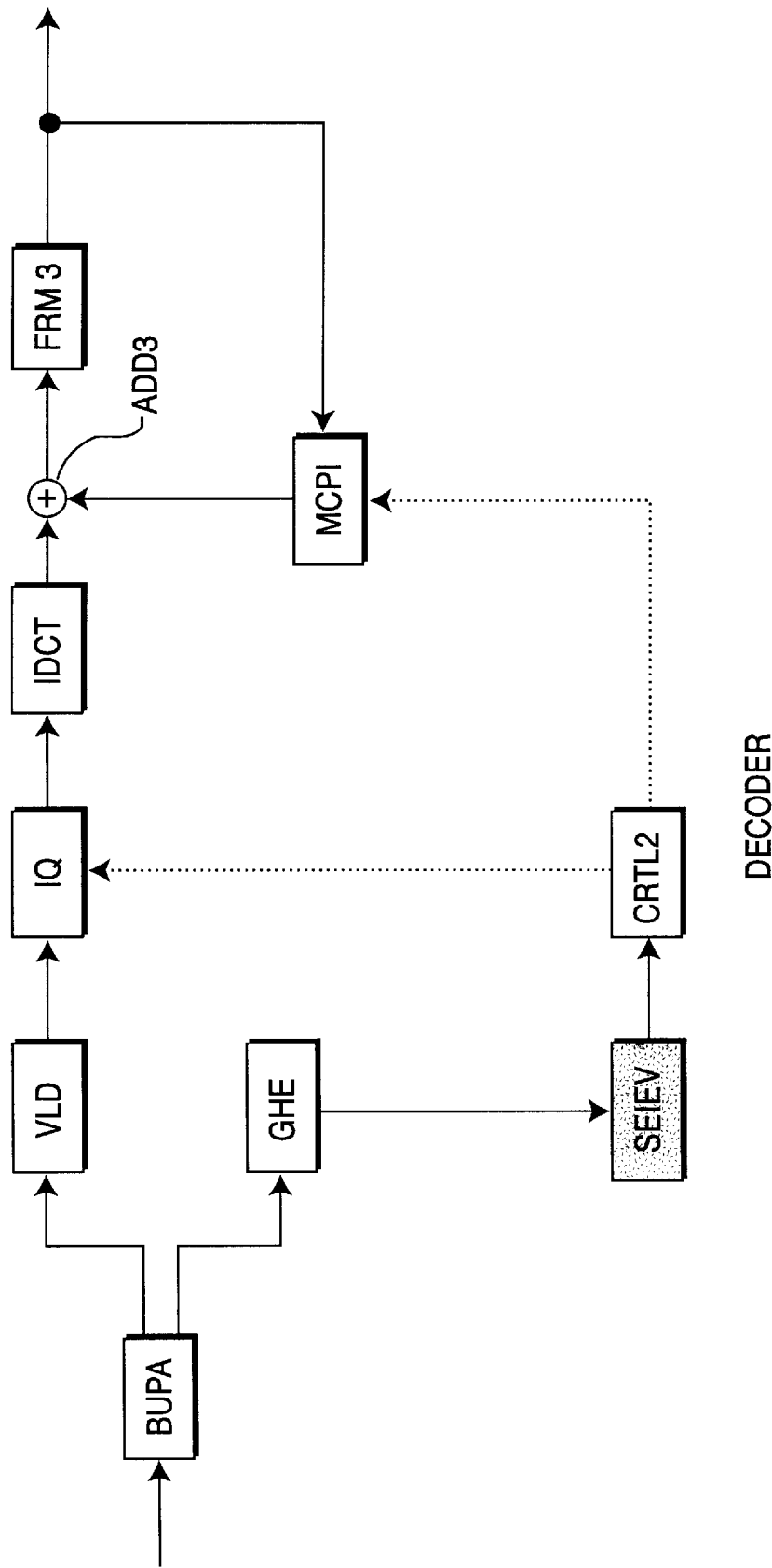
FIG. 5 shows a block diagram of a decoder which enables the decoding of the modified slice header.

FIG. 5 shows a block diagram of a decoder which evaluates the slice header according to the invention. Initially, the pure video data stream is recovered from the transmitted signal in a unit BUPA, which comprises a buffer memory and a parser. This video data stream is then supplied on the one hand to the header decoder unit GHE, which determines the header information from the video data stream. The additional parameters in the extrainformation slices are determined in a subsequent unit SEIEV. Both information items are then supplied to a control unit CTRL2. On the other hand, the Huffman encoding of the video data stream is reversed in the unit VLD. Inverse quantization is then carried out in IQ, the quantization rate being predetermined by the unit CTRL2, and an inverse discrete cosine transformation being carried out in IDCT.

In addition, the transmitted movement vectors can be transmitted from the unit CTRL2 to a decoder unit MCPI, in order to enable the prediction. The prediction is then corrected by the difference picture, with the aid of an adder ADD3. The result is then buffer-stored in a frame memory FRM3, in order to be available for the next prediction.

As a result of this measure, a special decoder, which can interpret the supplied additional information with, for example, shortened word lengths, is always able to decode the remainder of the frame correctly in the case of resynchronization to an extended slice header. This is possible even when the picture header and/or the picture-header extension are/is not available as a result of transmission errors. Long resynchronization times are avoided by insertion of extended slice headers into the MPEG-2 bit stream, and consequential errors in the decoding resulting from fault predictions are reduced. A standard decoder, which is not able to interpret the additional information, remains uninfluenced thereby.

The additional information which is required for resynchronization can also be arranged in more than one subordinate layer level.

The invention can be used, for example, for digital television systems such as DVB and HDTV, as well as for digital storage media such as DVD.

I claim:

1. Method for enabling resynchronization of a data stream which contains errors and is encoded, for the purpose of data compression, in the form of a hierarchical organization of various layers comprising the steps of:

decoding of the data information in a selected one of the layers when relevant data of at least one of the superordinate layers to the selected layer has been correctly decoded, and additional information from at least one superordinate layer or about the composition of at least one superordinate layer is inserted into the selected one subordinate layer, the relevant data being usable for the resynchronization.

2. Method according to claim 1, wherein the data stream complies with an MPEG standard.

3. Method according to claim 2, wherein a slice layer contains additional information about a frame layer.

4. Method according to claim 3, wherein the additional information is located in a header of the slice layer.

5. Method according to claim 2, wherein the additional information is used only in I- and P-frames.

6. Method according to claim 2, wherein the additional information is transmitted only in every other or in every third macroblock line.

7. Method according to claim 2, wherein the additional information relates to the time reference of the frame and/or the frame type and/or to important parameters for the decoding of movement vectors.

8. Method according to claim 2 wherein the relevant data is selected in such a manner that the number of bits required for this purpose is less than the number of bits for the corresponding information in the superordinate layers, in order to keep as small as possible the amount of data which has to be transmitted in addition.

9. Encoder for enabling decoder-end resynchronization to a data stream which contains errors and is encoded, for the purpose of data compression, in the form of a hierarchical organization of various layers, and having means for compression of the data, comprising:

means are provided in which relevant data about the composition of a superordinate layer is generated or determined for the insertion to a selected subordinate layer, the relevant data being usable for the decoder-end resynchronization, and the compressed data and the relevant data being joined together to form a data stream.

10. Encoder according to claim 9, wherein in the case of the means for compression of the video data, means for Huffman encoding are furthermore arranged after means for calculation of the correlation between successive frames and the correlation within a frame, the Huffman-encoded data being supplied to a buffer memory, and the means in which relevant data about the composition of the layer which is superordinate to the selected subordinate layer is generated for the latter are arranged between an encoder unit for generation of header parameters and the buffer memory.

11. Decoder for resynchronization to a data stream which contains errors and has been encoded at the encoder end, for the purpose of data compression, in the form of a hierarchical organization of various layers, and having means for decompression of the data stream, wherein means are provided in which relevant data about the composition of a superordinate layer to a selected subordinate layer is regenerated for the latter, the relevant data being used for the resynchronization.

12. Decoder according to claim 11, wherein the means for decompression of the video data comprise means for calculation of the correlation between successive frames and the correlation within a frame and means for Huffman decoding and, before the means for Huffman decoding, the data stream is also supplied to an encoder unit, in which header parameters are determined, and to the means in which relevant data about the composition of the layer which is superordinate to the selected subordinate layer is regenerated for the latter.

13. Method for resynchronization to a data stream which contains errors and has been encoded at the encoder end, for the purpose of data compression, in the form of a hierarchical organization of various layers, comprising the steps of:

decoding of the data information in a selected one of the layers when relevant data of at least one of the superordinate layers to the selected layer has been correctly decoded, and the relevant data which is contained in the one subordinate layer is determined the selected one subordinate layer and is used for the resynchronization.

* * * * *